(12) United States Patent
Weinert

(10) Patent No.: US 6,360,689 B1
(45) Date of Patent: Mar. 26, 2002

(54) CAT FEEDER

(76) Inventor: Pamela F. Weinert, 3350 W. Lake Rd., Canandaigua, NY (US) 14424

( * ) Notice: Subject to any disclaimer, the term of this patent is extended or adjusted under 35 U.S.C. 154(b) by 0 days.

(21) Appl. No.: 09/426,838

(22) Filed: Oct. 26, 1999

(51) Int. Cl.⁷ .................................................. A01K 1/03
(52) U.S. Cl. .................... 119/51.01; 119/475; 119/485
(58) Field of Search ........................... 119/51.01, 475, 119/484, 485, 706, 28.5; D30/117, 118, 119

(56) References Cited

U.S. PATENT DOCUMENTS

| | | | |
|---|---|---|---|
| 402,145 A | | 4/1889 | Critchfield et al. |
| 448,959 A | * | 3/1891 | Harp |
| 824,242 A | * | 6/1906 | Harp |
| 1,172,777 A | * | 2/1916 | Estel |
| 2,016,005 A | | 10/1935 | Giannasca |
| D125,280 S | * | 2/1941 | Little |
| 2,441,058 A | | 5/1948 | Carwile |
| 2,659,344 A | | 11/1953 | Herbert |
| 2,659,345 A | * | 11/1953 | Herbert |
| 3,160,140 A | * | 12/1964 | Porter |
| 3,173,398 A | | 3/1965 | Raymond |
| 3,814,058 A | * | 6/1974 | Thompson .................. 119/482 |
| D232,849 S | * | 9/1974 | Wilson |
| 3,857,365 A | * | 12/1974 | Mueller ...................... 119/28.5 |
| 4,291,645 A | * | 9/1981 | Cruchelow et al. ......... 119/484 |
| 4,334,501 A | * | 6/1982 | McDaniel et al. .......... 119/482 |
| 4,445,459 A | * | 5/1984 | Julie ......................... 119/28.5 |
| 4,497,279 A | | 2/1985 | Bell |
| D290,767 S | | 7/1987 | Duffer |
| D294,184 S | | 2/1988 | Arthur, II |
| 4,753,195 A | * | 6/1988 | Maggio ...................... 119/52.2 |
| 5,000,124 A | | 3/1991 | Bergen |
| 5,002,012 A | | 3/1991 | Pierrot |
| 5,038,716 A | | 8/1991 | Olson |
| 5,161,484 A | | 11/1992 | Duane |
| 5,167,202 A | | 12/1992 | Bradford et al. |
| D349,590 S | | 8/1994 | Berger |
| D349,783 S | | 8/1994 | Berger |
| 5,337,697 A | * | 8/1994 | Trimarchi et al. .......... 119/484 |
| D351,258 S | | 10/1994 | Berger |
| 5,435,266 A | * | 7/1995 | Carson ....................... 119/464 |
| D361,647 S | | 8/1995 | Thomas et al. |
| 5,448,965 A | * | 9/1995 | McClure ..................... 119/482 |
| D364,489 S | | 11/1995 | Cook |
| 5,509,373 A | * | 4/1996 | Elesh ......................... 119/28.5 |
| D388,555 S | | 12/1997 | Lewis |
| 5,709,164 A | | 1/1998 | Batterton |
| 5,713,306 A | | 2/1998 | Johnson |
| 5,809,933 A | * | 9/1998 | Conwell, III .............. 119/28.5 |
| D406,678 S | * | 3/1999 | Rittenhouse ................ D30/108 |
| 5,884,586 A | * | 3/1999 | Carbonelli .................. 119/485 |
| 5,937,792 A | * | 8/1999 | Madrid ....................... 119/482 |
| D422,754 S | * | 4/2000 | Kolozsvari et al. ........ D30/118 |

* cited by examiner

*Primary Examiner*—Charles T. Jordan
*Assistant Examiner*—Yvonne R. Abbott
(74) *Attorney, Agent, or Firm*—Brian B. Shaw, Esq.; Stephen B. Salai, Esq.; Harter, Secrest & Emery LLP

(57) ABSTRACT

An indoor elevated cat feeder that has a platform to support a cat, food, and water. It also has walls to protect the cat from annoyance by a dog, but has no roof or has a roof that may be opened so that a person may pet the cat while the cat is on the platform.

2 Claims, 10 Drawing Sheets

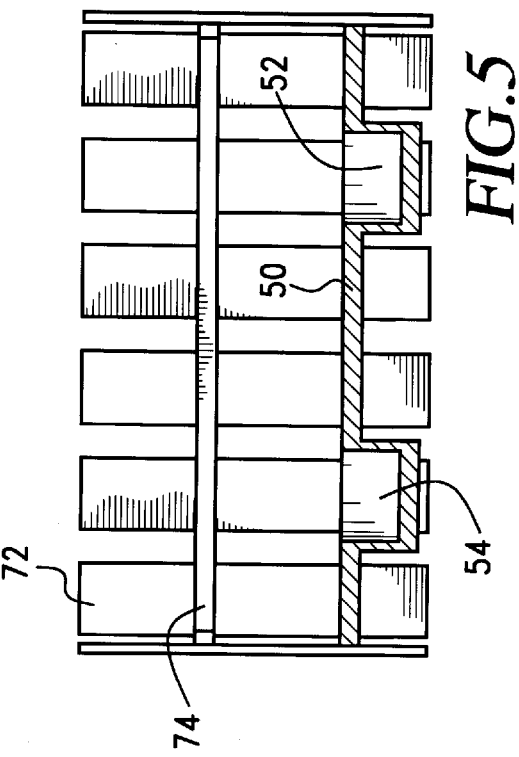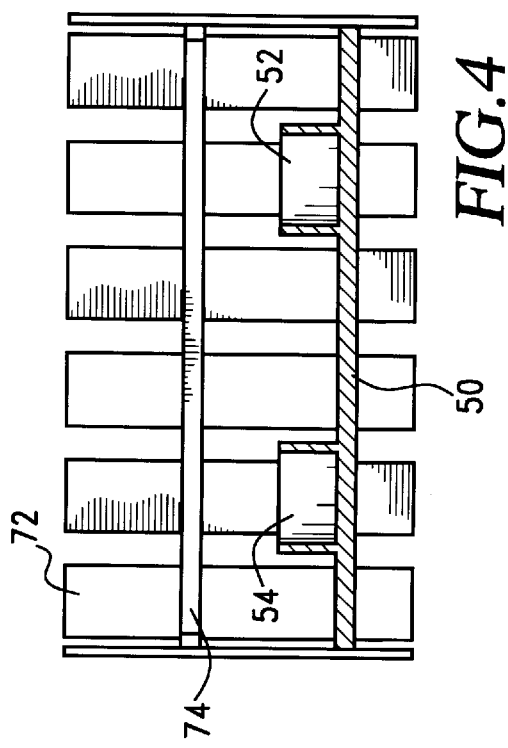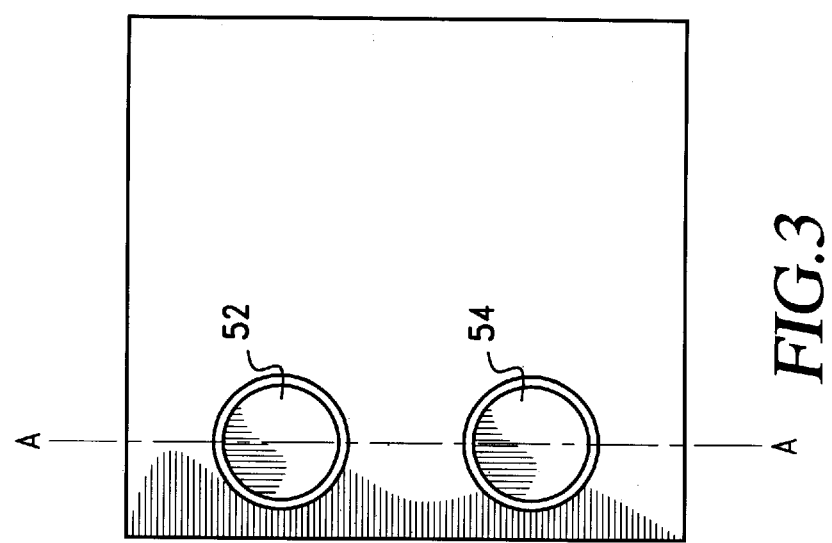

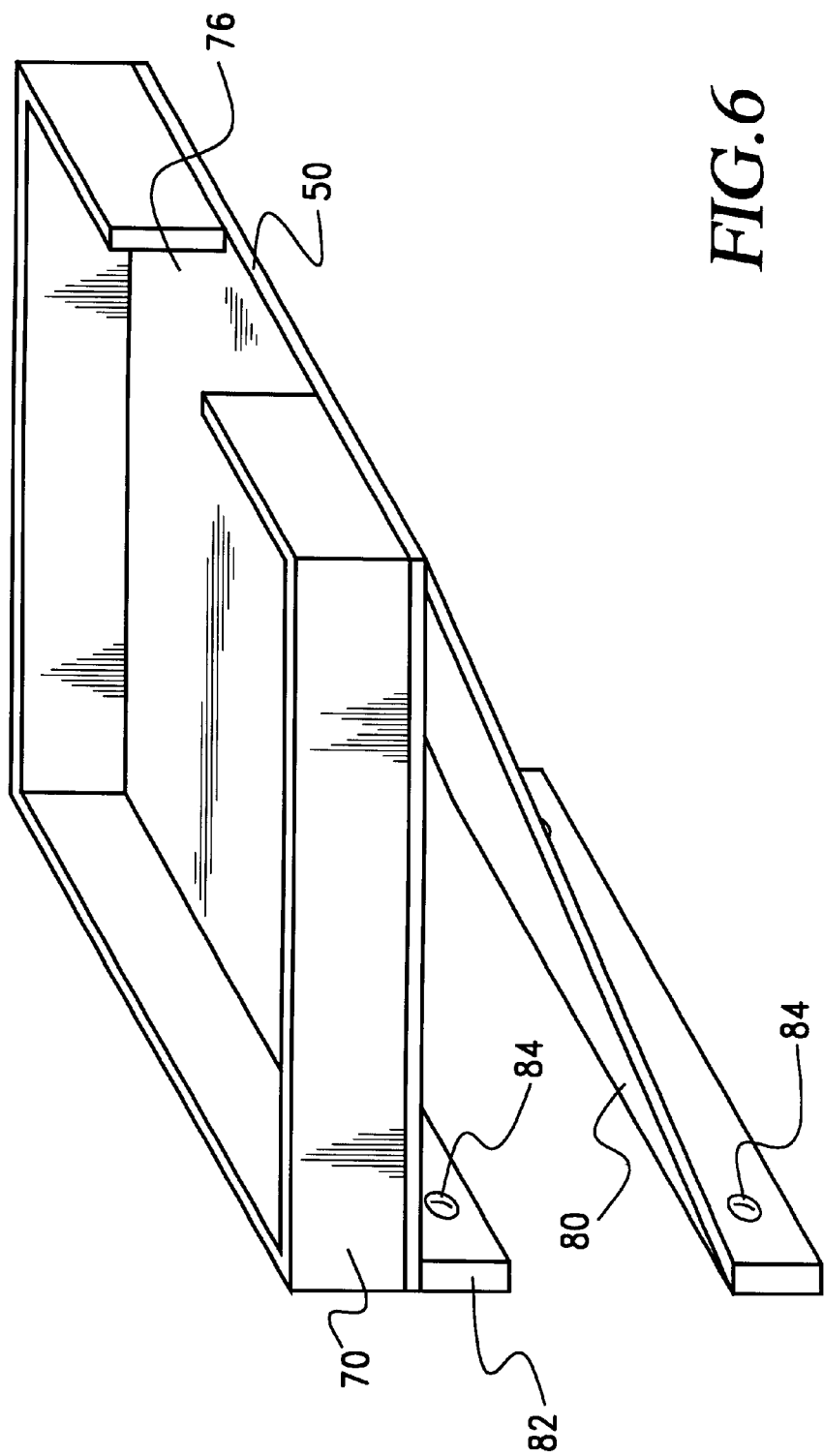

CAT FEEDER

FIELD OF THE INVENTION

This invention relates to a feeder for small domesticated animals with substantial jumping ability. It is especially designed for cats which are kept inside the home where dogs are also kept.

BACKGROUND OF THE INVENTION

Many households have both cats and dogs as pets within the home. Because these animals have differing natures, conflicts can arise. Dogs have a reputation for being very curious about, and annoying or threatening to cats.

There are known devices which provide a roofed shelter for cats for outdoor use. There are also indoor platforms which rest upon a windowsill or are placed upon a floor.

There is no known elevated cat feeder which is supported from a wall or from a built in support mechanism which is for indoor use and has an opening in a wall designed to allow a leaping cat to pass through, but prevent the entrance of a large animal such as a dog.

SUMMARY OF THE INVENTION

The present invention relates to a cat feeder that provides a comfortable, convenient, and private for a cat to feed without being troubled by a dog within the home.

It is an object of the present invention is to provide a cat its own place.

An object of the present invention is to provide a food dish and a water dish in a platform which is elevated such that a cat may easily ascend the platform, but a dog may not and, furthermore, having walls such that the height of the walls will prevent entry by a dog and having an aperture which will allow passage of a jumping cat and not a dog.

The present invention is an elevated roofless cat feeder for indoor use. The cat feeder has a platform forming a base of the cat feeder, walls surrounding all sides of the cat feeder, but only one of the walls having an aperture in which the aperture is sized to allow passage of a typical cat, but prevent passage of a typical dog, and elevational means which raise the platform above a floor at a height which permits a cat to be able to leap onto the platform through the aperture, but high enough to prevent access by a dog.

The elevational means may be a bracket, a support board for attachment to a wall, a chain for suspension from a ceiling or other high point, or a pedestal and base which give a height to the platform.

The elevational means may be adjustable to provide different heights. The platform may have an integrally formed a food dish, a water dish, a receptacle for bedding material or a receptacle for kitty litter.

BRIEF DESCRIPTION OF THE DRAWINGS

FIG. 3 shows a platform having a food dish and a water dish.

FIG. 4 shows one embodiment along cut line A-A in which the water dish and the food dish are raised above the platform major surface.

FIG. 5 shows a cross-sectional view along cut line A-A in which the water dish and feeding dish extend below the surface of the platform.

FIG. 6 shows a third embodiment.

DETAILED DESCRIPTION OF THE PREFERRED EMBODIMENT

The present invention relates to a cat feeder which is elevated so as to permit a leaping cat to enter, but not a dog. It also has an aperture in the wall sized to pass a cat, but not a dog. It is designed to provide a private area for a cat; especially to serve as a kitty café.

Figure 1:
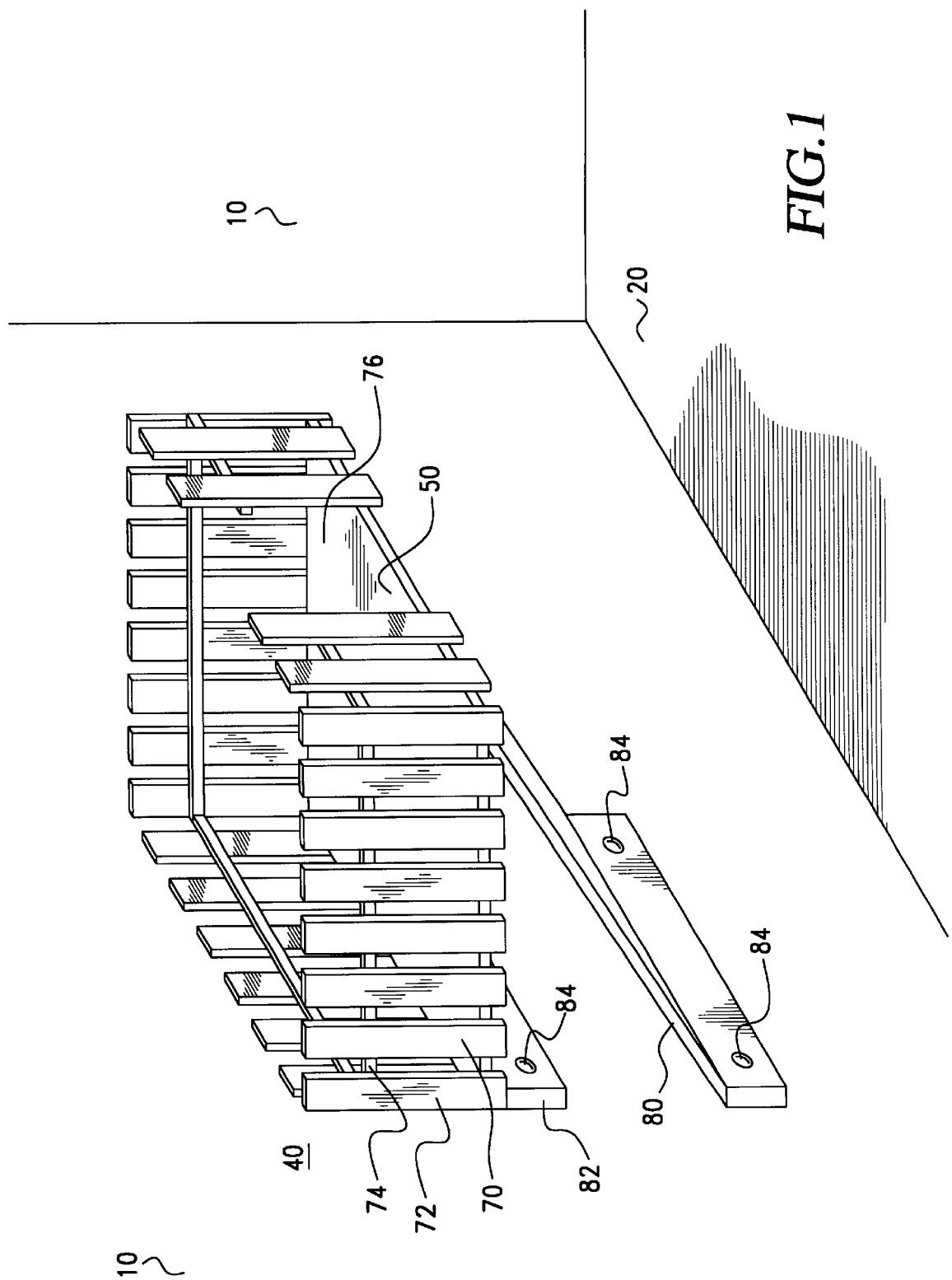
FIG. 1 shows a first embodiment of the present invention.

FIG. 1 shows a first embodiment of the invention. In this embodiment, the cat feeder is mounted onto a wall 10. The cat feeder has a platform 50 in which a food dish may be placed and which will support the cat. About the platform, fence like material is used to form the walls. The walls 70 are formed of a multitude of fence posts 72. The fence posts 72 are attached to the platform 50 by means such as nails or screws or even an adhesive material. Further supporting the walls are fence supports 74. An optimal height of a fence post 72 is about 12 inches. Gaps between fence posts 72 prevent any claustrophobic effect for a cat. Such gaps also allow the owner to keep tabs on a tabby. The platform and fence 70 are supported on one end by a support board 82 which is screwed or nailed to the wall 10 to studs on the inside. Also, a bracket 80 supports the weight on the opposing side of platform 50. The bracket may be various shapes, but preferably, is angled to find support to the wall 10 by nails or screws 84 preferably penetrating the studs. The platform 50 should be set at an adequate height above floor 20. The setting of the height should be customized to permit the family cat or cats to easily leap onto the platform 50 through aperture 76. The height should be set preferably so as to prevent a dog from reaching through the aperture 76. Further enhancing the access of a cat, but not of a dog is to provide an aperture 76 into the cat feeder 40.

The cat feeder may be made of various materials. The materials must be sufficiently sturdy, rigid and lightweight so as to be secured to a wall and support the weight of a cat and food for the cat. The materials that may be used include plastic, metal and wood. The material should be not only sufficiently strong, but able to provide an aesthetic appearance and be sufficiently comfortable for a cat.

Figure 2:
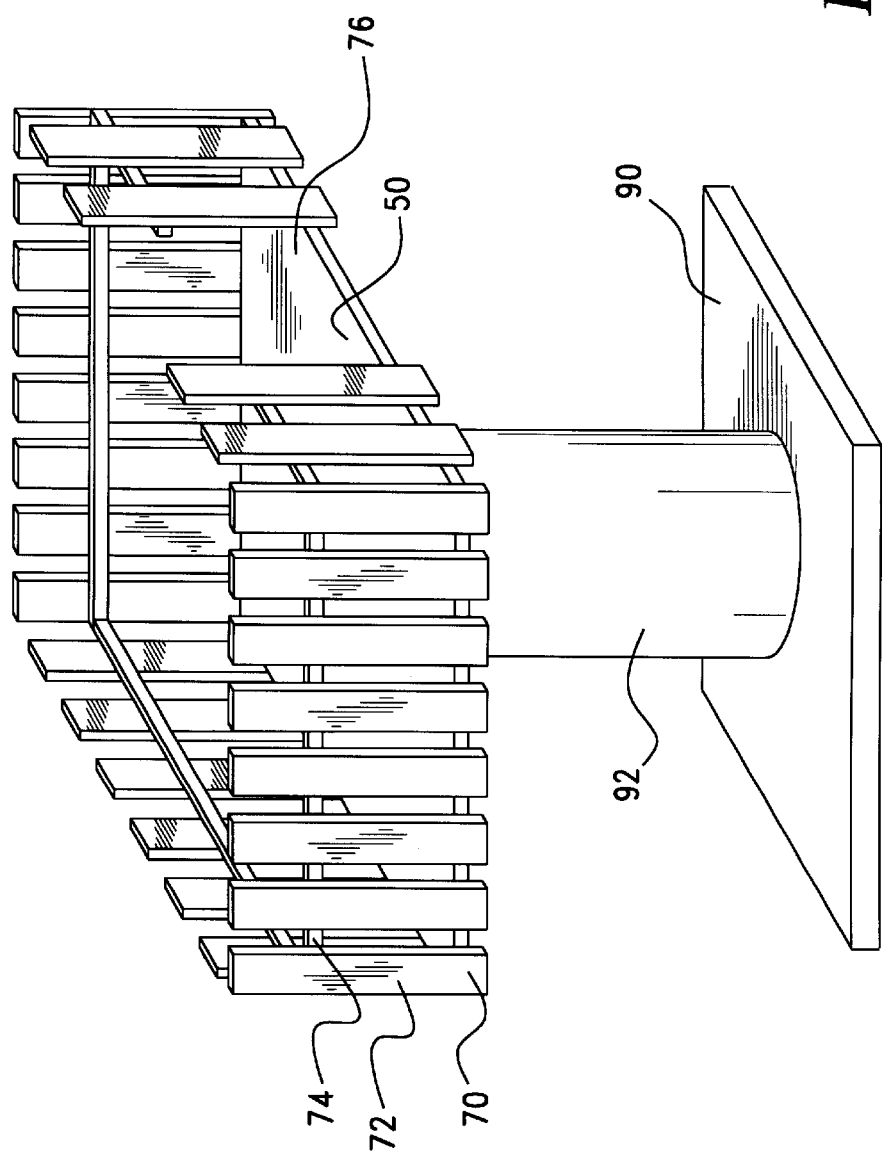
FIG. 2 shows a second embodiment of the present invention.

FIG. 2 shows a cat feeder having a platform 50 and walls 70 similar to that of the first embodiment. In this second embodiment, the cat feeder includes a pedestal 92 and a base 90 for distributing the weight and providing elevation to the platform. The base must be heavy enough so as to provide stability to the platform.

FIG. 3 shows the platform 50 in a top down view. In FIG. 3, there are shown a water dish 52 and a food dish 54. These dishes may be placed on the platform or they may be made integral with the platform.

FIG. 4 shows a cut away view along section line A-A in which the water dish 52 and food dish 54 are shown elevated above the platform 50.

FIG. 5 shows an alternative embodiment in which water dish 52 and food dish 54 are set beneath the surface of platform 50.

FIG. 6 shows an embodiment of the cat feeder in which walls 70 are of a solid imperforate material. In this embodiment, the cat feeder is supported by the wall through support board 82 and bracket 80.

Figure 7:
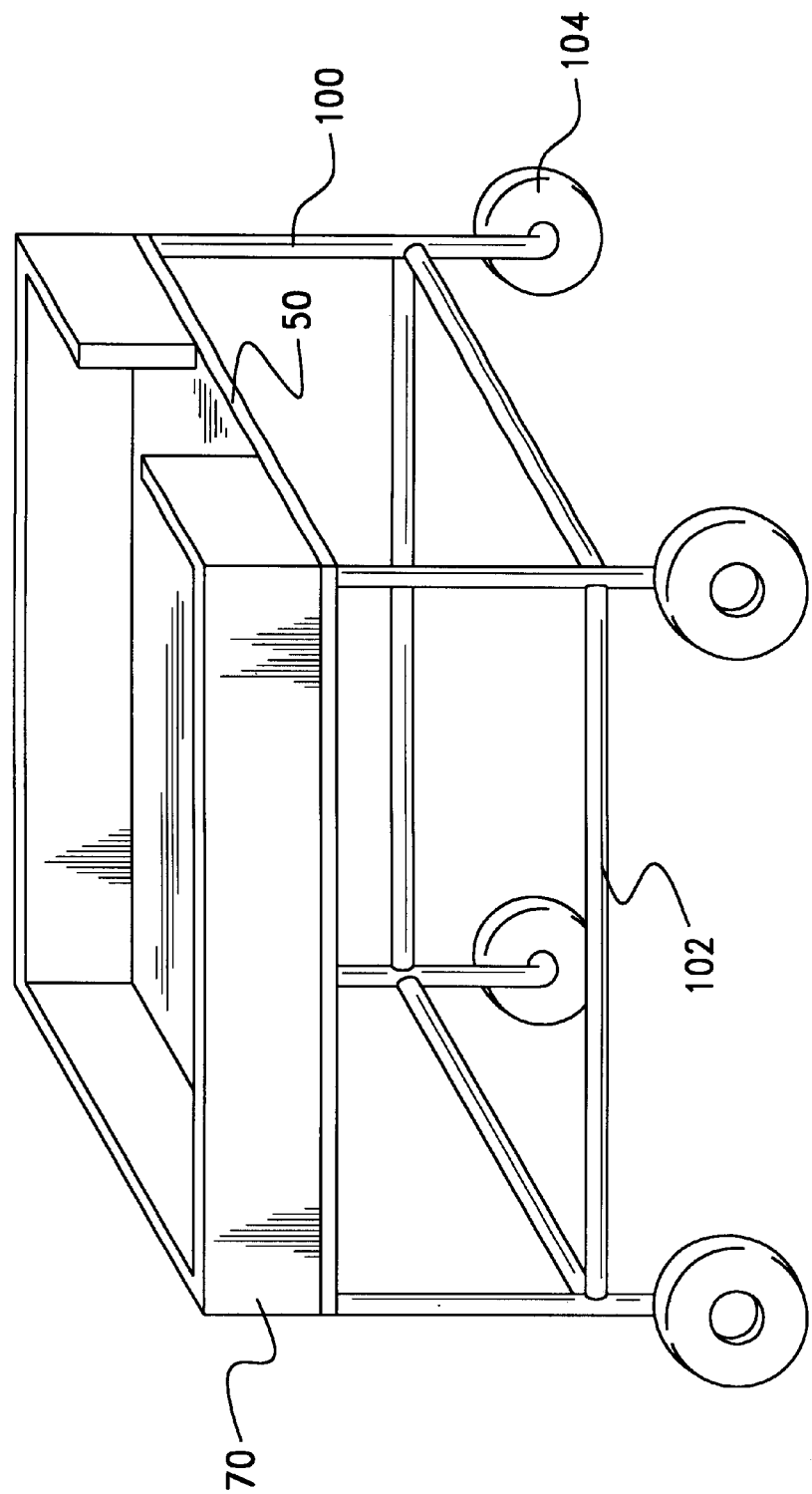
FIG. 7 shows a fourth embodiment.

FIG. 7 shows an embodiment having legs 100 which are supported by supports 102. In particular, FIG. 7 shows an embodiment in which the legs are supported on wheels 104. The cat feeder need not have wheels. The wheels of this embodiment are preferably pivotable. They may, however, also be lockable.

Figure 8:
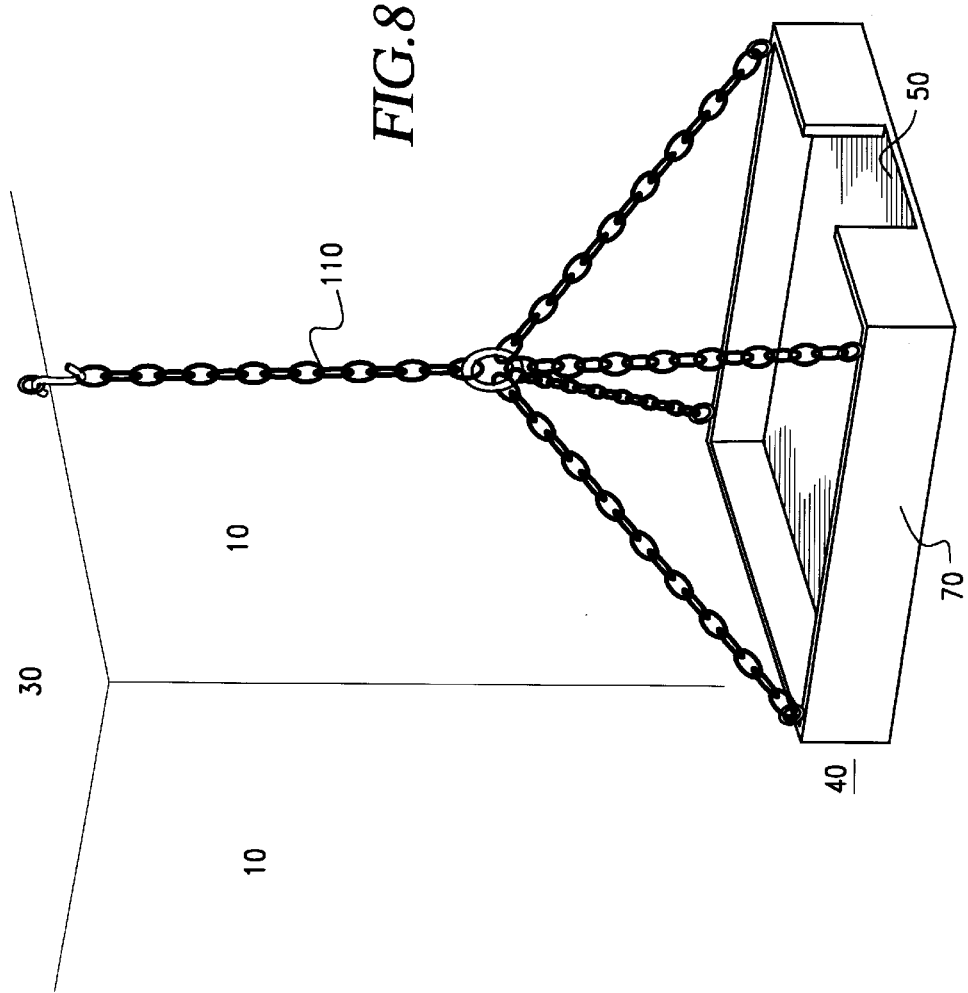
FIG. 8 shows a fifth embodiment.

FIG. 8 shows an embodiment in which a cat feeder comprises a platform 50 and walls 70 and has elevational means in the form of a bridle. The bridle includes a chain 110 hanging from a ceiling 30. Instead of a single chain extending from the ceiling 30, the suspension mode may be achieved by having several supports extending from various points on the walls or platform to the ceiling. In certain situations, the cat feeder may be suspended by supports extending from the wall such as chains.

Figure 9:
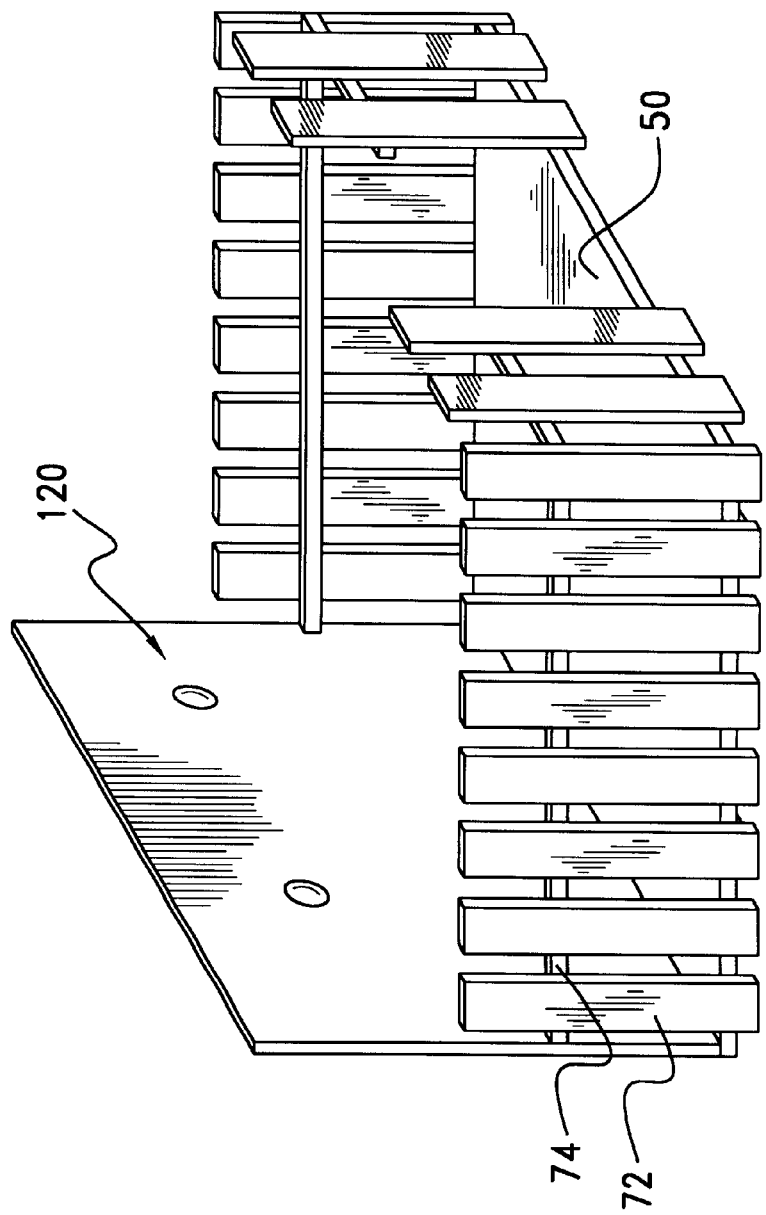
FIG. 9 shows a sixth embodiment.

FIG. 9 shows an embodiment having an L-shaped platform 120 and 150. In the L-shaped platform, there is a side wall 120 with mounting apertures and a floor 50 extending perpendicularly from the side wall. A retaining or obstructing wall in the form of a solid or fence or screen may be affixed to the perimeter of the platform 50. The side wall 120 may be bolted, screwed or nailed.

Figure 10:
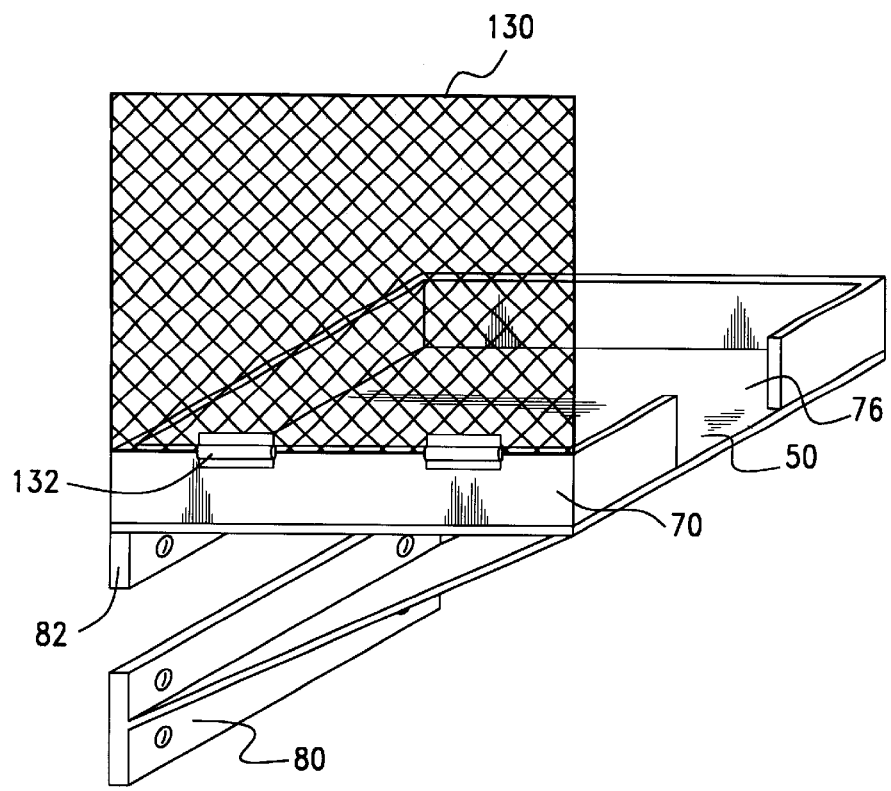
FIG. 10 shows a sixth embodiment in which a screen serves as a hingeable roof fitting over the box.

FIG. 10 shows an embodiment in which a screen 130 is attached to a wall 70 through hinges 132. FIG. 10 shows the screen lifted from the box.

Figure 11:
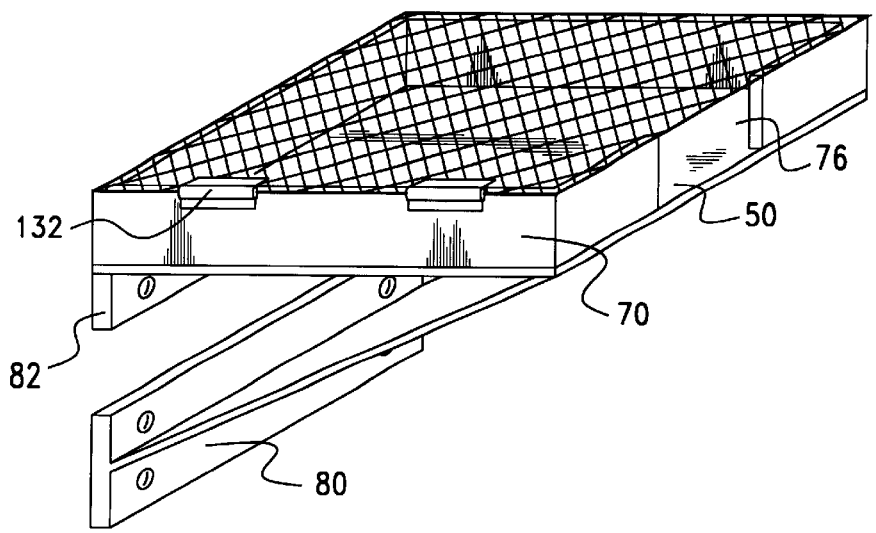
FIG. 11 shows a sixth embodiment in which the screen roof is closed over the box.

FIG. 11 shows the screen closed over the cat feeder.

Figure 12:
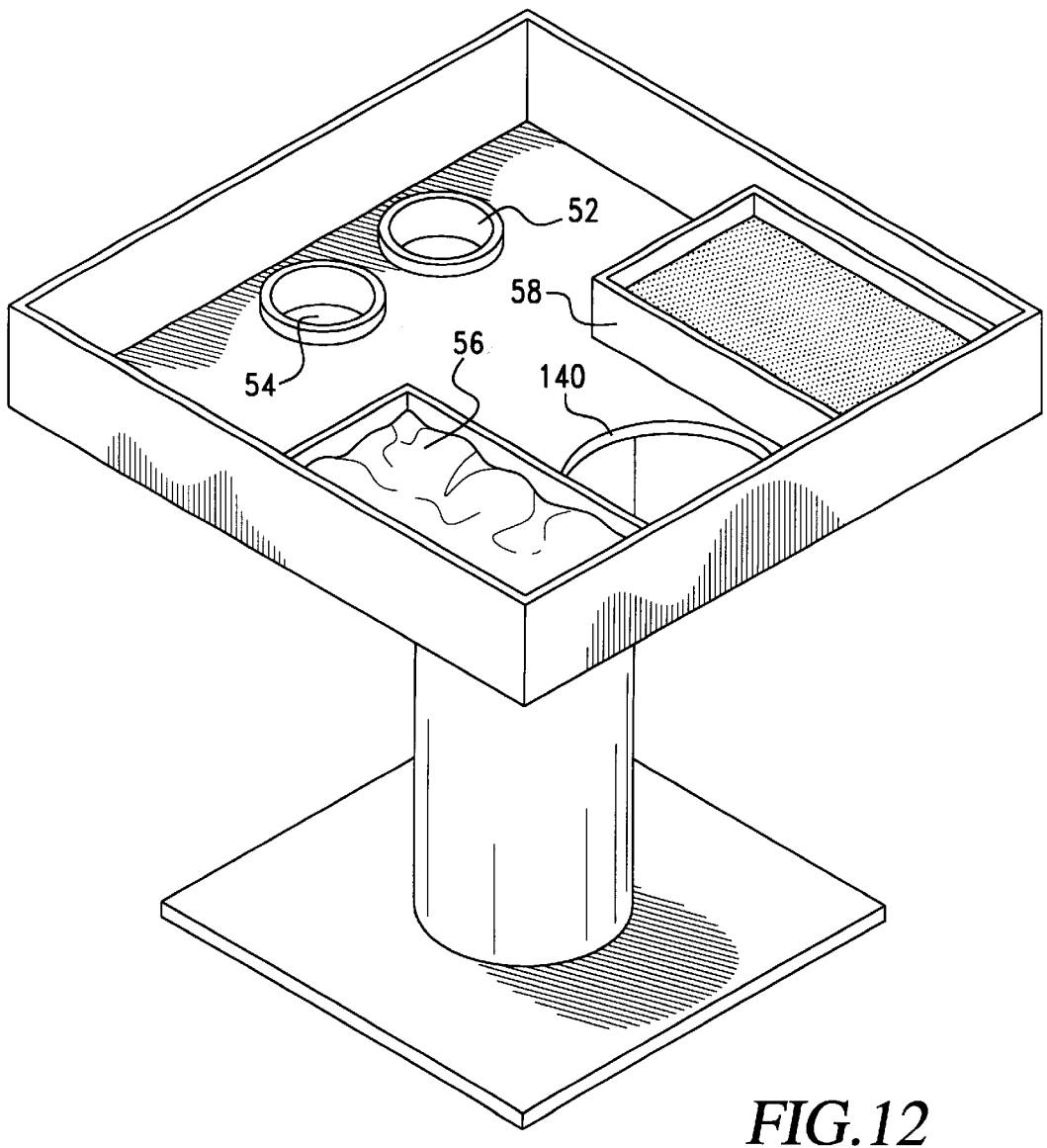
FIG. 12 shows a seventh embodiment.

FIG. 12 shows an embodiment in which the cat feeder has imperforate walls 70 all about the platform 50. In platform 50, is a cat access aperture 140. The embodiment of FIG. 12 is supported by a base and pedestal. In this embodiment are a water dish 52 and food dish 54. Formed in the cat feeder are also a bed receptacle 56 and a kitty litter receptacle. These receptacles 56 and 58 may be formed from the platform or from the platform end a wall or walls.

Figure 13:
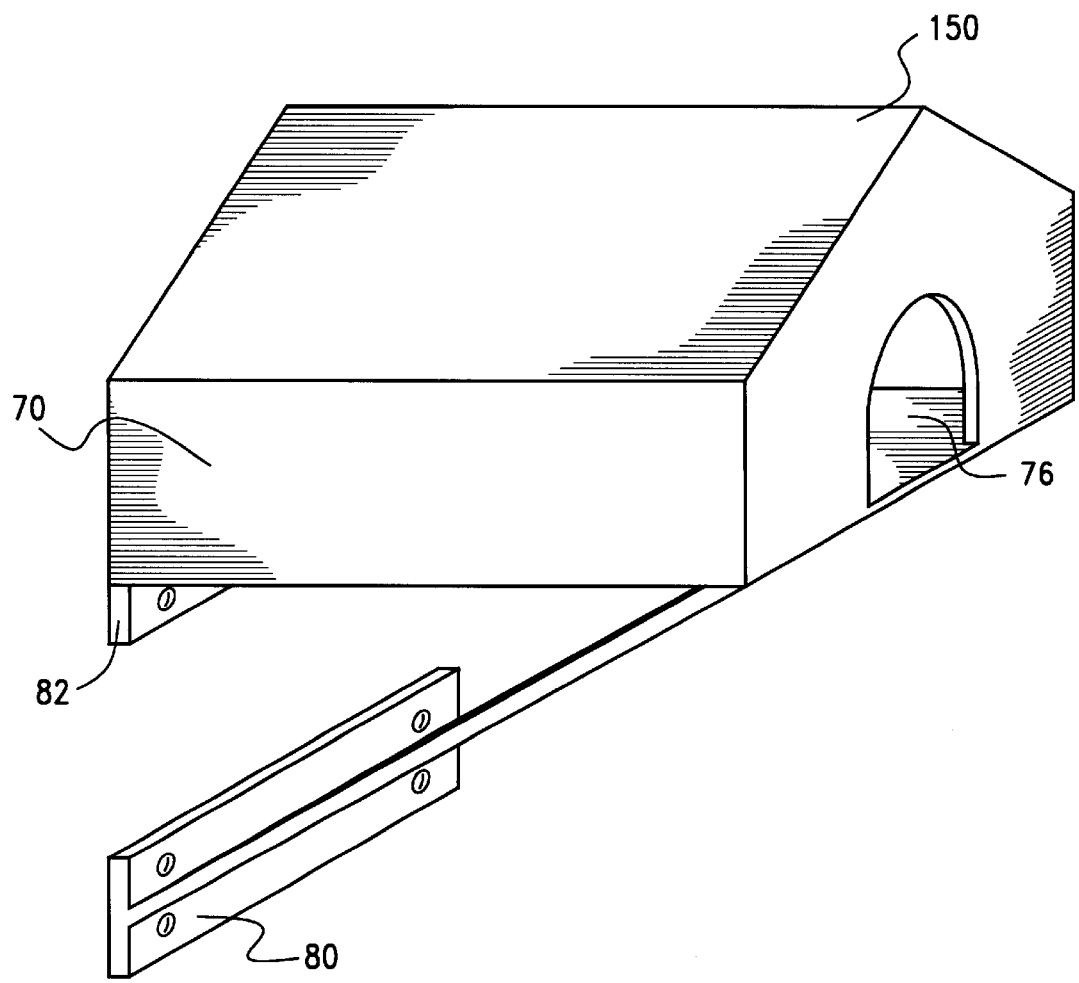
FIG. 13 shows an eighth embodiment.

FIG. 13 shows an embodiment having a roof 150.

Other features may be added to the cat feeder. For instance, a small scratching post might be mounted within the perimeter of the platform 40. Another possibility is to install kitty toys, perhaps even kitty toys suspended from a suspension device mounted inside.

The platform 50 has been shown as squarish. It may be rectangular. In one realized application, a 24 inch by 12 inch platform was used. The platform may also be oval or circular. For that matter, bed and kitty litter receptacles may be of various shapes including circular. The bed receptacle 56, the kitty receptacle 58, the water dish 52 and the food dish 54 may be made semi-permanent so as to permit removeability only when desired on occasion.

One advantage of a roofless cat feeder is to permit a person to pet the cat with the cat's private space as well as prevent a dog from annoying a cat.

Another material for making the cat feeder is plastic. The described embodiments are merely meant to be illustrative of the invention. It is readily conceded that numerous other arrangements may be devised by those of ordinary skill in the art while remaining within the principals and spirit of the invention. The present invention is intended to be limited only by the scope of the appended claims.

What is claimed:

1. An elevated cat feeder for indoor use, comprising:
   a) a platform;
   b) an enclosing wall having an aperture that is large enough to admit a cat extending upwards from the platform;
   c) a support board having mounting apertures, the support board attached to one side of the platform and also connected to a dwelling wall; and
   d) said enclosing wall being constructed of a series of fence posts.

2. An elevated cat feeder for indoor use, comprising:
   a) a platform;
   b) an enclosing wall having an aperture that is large enough to admit a cat extending upwards from the platform;
   c) a support board having mounting apertures, the support board attached to one side of the platform and also connected to a dwelling wall; and
   d) said platform having built in depressions for food and water.

\* \* \* \* \*